(12) United States Patent
Zhou et al.

(10) Patent No.: US 8,526,534 B2
(45) Date of Patent: Sep. 3, 2013

(54) METHOD FOR TRANSMITTING INFORMATION ACCORDING TO TARGET ENCODING RATE, BASE STATION AND MOBILE STATION

(75) Inventors: Lei Zhou, Shenzhen (CN); Xueli Kong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/355,994

(22) Filed: Jan. 23, 2012

(65) Prior Publication Data
US 2012/0121026 A1 May 17, 2012

Related U.S. Application Data

(63) Continuation of application No. PCT/CN2010/078769, filed on Nov. 16, 2010.

(30) Foreign Application Priority Data
Nov. 18, 2009 (CN) .......................... 2009 1 0109671

(51) Int. Cl.
H04L 25/08 (2006.01)
(52) U.S. Cl.
USPC .......................................................... 375/296
(58) Field of Classification Search
USPC .................................... 375/295, 296, 354
See application file for complete search history.

(56) References Cited

U.S. PATENT DOCUMENTS

| 7,583,968 B2* | 9/2009 | Kimura .......................... 455/450 |
| 2003/0133497 A1 | 7/2003 | Kinjo et al. |
| 2006/0039344 A1 | 2/2006 | Khan |
| 2006/0193351 A1 | 8/2006 | Kim et al. |
| 2011/0239075 A1 | 9/2011 | Xu et al. |

FOREIGN PATENT DOCUMENTS

| CN | 1859603 A | 11/2006 |
| CN | 101114887 A | 1/2008 |
| CN | 101119153 A | 2/2008 |
| CN | 101217337 A | 7/2008 |
| CN | 101325474 A | 12/2008 |

(Continued)

OTHER PUBLICATIONS

3$^{rd}$ Generation Partnership Project (3GPP), Alcatel-Lucent, Alcatel-Lucent Shanghai Bell, "Type II Relay Operation in LTE-A," 3GPP TSG RAN WG2 #66bis, R2-093817 (R2-093091), Los Angeles, CA (Jun. 29-Jul. 3, 2009).

(Continued)

Primary Examiner — Kevin Kim
(74) Attorney, Agent, or Firm — Leydig, Voit & Mayer, Ltd.

(57) ABSTRACT

A method for transmitting information according to a target encoding rate is provided according to the embodiments of the present invention, which includes: obtaining basic information bits and at least one incremental information bit from information encoded by a base station (BS) according to a target encoding rate; and sequentially transmitting the basic information bits and the at least one incremental information bit to a mobile station (MS) within a determined time interval, in which the target encoding rate is an encoding rate used by the BS when the MS is capable of correctly decoding the information transmitted by the BS. A BS and an MS are further provided according to the embodiments of the present invention, thereby reducing power consumption by the MS.

21 Claims, 8 Drawing Sheets

(56) References Cited

FOREIGN PATENT DOCUMENTS

| CN | 101388744 A | 3/2009 |
|---|---|---|
| EP | 1838063 A1 | 9/2007 |
| EP | 1847038 A1 | 10/2007 |
| WO | WO 2007/104231 A1 | 9/2007 |
| WO | WO 2008/068803 A1 | 6/2008 |
| WO | WO 2008/115023 A1 | 9/2008 |
| WO | WO 2009/021579 A1 | 2/2009 |

OTHER PUBLICATIONS

3rd Generation Partnership Project (3GPP), Alcatel-Lucent Shanghai Bell, Alcatel-Lucent, "Optional Retransmission Schemes for LTE-A MBMS," 3GPP TSG-RAN WG RAN1#55bis, R1-090063, Ljubljana, Slovenia (Jan. 12-16, 2009).

3rd Generation Partnership Project (3GPP), Nortel, "Further Discussion on Advanced MBSFN for LTE-A," 3GPP TSG-RAN Working Group 1 Meeting #56bis, R1-091376, Seoul, Korea (Mar. 23-27, 2009).

Phan et al., "Adaptive Point-to-Multipoint Transmission for Multimedia Broadcast Multicast Services in LTE," Herzogenrath, Germany, {mai-anh.phan, joerg.huschke} @ericsson.com, ©Ericsson GmbH 2009.

Rossi et al., "Link Layer Algorithms for Efficient Multicast Service Provisioning in 3G Cellular Systems," University of Ferrara, Department of Engineering, Via Saragat 1, 1-44100 Ferrara, Italy, email: {mrossi, mzorzi} @ing.unife.it; Department of Communications Technology, Aalborg University, Neils Jernes Vej 12, 9220 Aalborg Øst, Denmark, email: ff@kom.aau.dk.

Extended European Search Report in corresponding European Patent Application No. 10831120.0 (Jul. 6, 2012).

"Tdoc R2-030055—Supporting Differentiated Quality to Mobile Multimedia Devices using Scalable MBMS," 3GPP Joint TSG-RAN WG2 and WG3 MBMS Meeting, Jan. 2003, 3GPP, Valbonne, France.

International Search Report in corresponding PCT Application No. PCT/CN2010/078769 (Feb. 24, 2011).

1st Office Action in corresponding European Patent Application No. 10 831 120.0 (Mar. 8, 2013).

1st Office Action in corresponding Chinese Patent Application No. 200910109671.0 (Dec. 25, 2012).

Search Report in corresponding Chinese Patent Application No. 200910109671.0 (Dec. 13, 2012).

Written Opinion of the International Searching Authority in corresponding International Patent Application No. PCT/CN2010/078769 (Feb. 24, 2011).

* cited by examiner

METHOD FOR TRANSMITTING INFORMATION ACCORDING TO TARGET ENCODING RATE, BASE STATION AND MOBILE STATION

CROSS-REFERENCE TO RELATED APPLICATIONS

This application is a continuation of International Application No. PCT/CN2010/078769, filed on Nov. 16, 2010, which claims priority to Chinese Patent Application No. 200910109671.0, filed on Nov. 18, 2009, both of which are hereby incorporated by reference in their entireties.

FIELD OF THE INVENTION

The present invention relates to the field of communications technologies, and in particular, to a method for transmitting information according to a target encoding rate, a base station (BS), and a mobile station (MS).

BACKGROUND OF THE INVENTION

In a wireless broadcast and multicast system, radio link quality of MSs varies significantly with MS location, and channel conditions between some MSs and BSs are relatively desirable, while others are very poor. In order to consider receiving capabilities of most of the terminals that need to receive broadcast and multicast information in a cell, the BS generally needs to select an encoding rate with a service quality acceptable to the terminals in the cell which exhibit poorer channel quality, and then transmit information to all terminals in the cell at the selected encoding rate.

In the current broadcast and multicast information technologies, a first MS may have a high probability to correctly receive signals with a high encoding rate since the first MS is close to the BS and the channel condition is desirable, while a second MS has a low probability to correctly decode the signals with the high encoding rate since the second MS is far away from the BS and the channel condition is poor. When the BS transmits the broadcast and multicast information, in order to enable the first MS and the second MS to both correctly decode the received signals, the BS can only transmit the information at an encoding rate that can be accepted by the second MS.

In the implementation of the present invention, the inventor finds that the prior art has at least the following problems. Since the BS transmits the information at a relatively low encoding rate, all the MSs that need to receive the broadcast and multicast information should maintain a radio frequency receiving state at all times until the transmission of the broadcast and multicast information to be received is completed. Therefore, not only is the power consumption of the MSs increased, but the broadcast and multicast information received by MSs close to the BS with desirable channel conditions have a large number of redundancies. Under such circumstances, the receiving efficiency is low.

SUMMARY OF THE INVENTION

Embodiments of the present invention provide a method for transmitting information according to a target encoding rate, a receiving method, a BS, and an MS so as to reduce MS power consumption and reduce redundancies.

According to one aspect of the present invention, a method for transmitting information according to a target encoding rate is provided, which includes:

obtaining basic information bits and at least one incremental information bit from information encoded by a BS according to a target encoding rate; and sequentially transmitting the basic information bits and the at least one incremental information bit to an MS within a determined time interval;

in which, the target encoding rate is an encoding rate used by the BS when the MS is capable of correctly decoding the information transmitted by the BS.

According to another aspect of the present invention, a method for receiving information transmitted by a BS according to a target encoding rate is further provided, which includes:

receiving basic information bits obtained from information encoded by the BS according to the target encoding rate and transmitted by the BS; and within a determined time interval, if it is determined that the basic information bits are correctly decoded, stopping receiving incremental information bits obtained from the information encoded by the BS according to the target encoding rate and sequentially transmitted by the BS within the determined time interval;

in which, the target encoding rate is an encoding rate used by the BS when the MS is capable of correctly decoding the information transmitted by the BS.

According to another aspect of the present invention, a BS is further provided, which is configured to transmit information according to a target encoding rate, and includes:

a matching unit, configured to obtain basic information bits and at least one incremental information bit from information encoded by the BS according to the target encoding rate; and a transmission unit, configured to sequentially transmit the basic information bits and the at least one incremental information bit to an MS within a determined time interval;

in which, the target encoding rate is an encoding rate used by the BS when the MS is capable of correctly decoding the information transmitted by the BS.

According to another aspect of the present invention, an MS is further provided, which includes:

a receiving unit, configured to receive basic information bits obtained from information encoded by a BS according to a target encoding rate and transmitted by the BS; and a decoding unit, configured to determine whether the basic information bits are capable of being correctly decoded within a determined time interval.

in which the receiving unit is further configured to stop receiving incremental information bits obtained from the information encoded by the BS according to the target encoding rate and sequentially transmitted by the BS within the determined time interval when the decoding unit correctly decodes the basic information bits, and the target encoding rate is an encoding rate used by the BS when the MS is capable of correctly decoding the information transmitted by the BS.

Through the technical solutions provided by the embodiments of the present invention, the basic information bits and the at least one incremental information bit are obtained according to the target encoding rate, and are transmitted to the MS, so that the MS does not need to receive the incremental information bit when correctly decoding the basic information bits, or the MS does not need to receive the remaining incremental information bits when correctly decoding the basic information bits and the at least one incremental information bit, thereby saving electric quantity of the MS and reducing the existing redundancies.

BRIEF DESCRIPTION OF THE DRAWINGS

To illustrate the technical solutions according to the embodiments of the present invention more clearly, the accompanying drawings which describe the embodiments are introduced briefly in the following. The accompanying drawings in the following description represent only a subset of all embodiments of the present invention, and persons of ordinary skill in the art can derive other drawings from the accompanying drawings without creative effort.

DETAILED DESCRIPTION OF THE EMBODIMENTS

The technical solutions in the embodiments of the present invention will be clearly and fully described in the following with reference to the accompanying drawings. The embodiments described herein are only a subset of all of the embodiments of the present invention. All other embodiments obtained by persons of ordinary skill in the art based on the embodiments of the present invention without creative effort fall within the scope of the present invention.

In one embodiment, during wireless communication, in order to ensure reliable information transmission in the case of poor wireless channel conditions, a Base Station (Base Station, BS) needs to encode the transmitted information, and then selects an encoding rate matching the channel conditions to encode the information to be transmitted, and performs rate matching on encoded information bits, which may be known as "punching".

Figure 1:
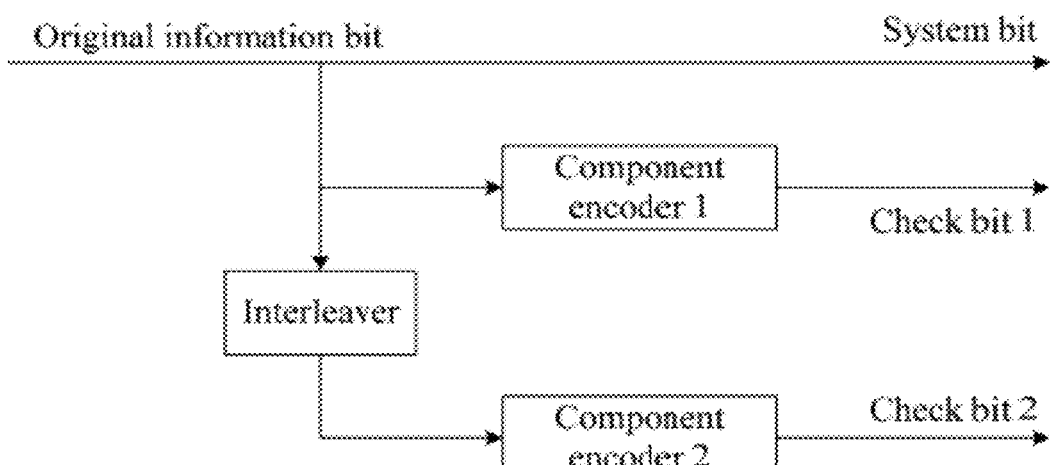
FIG. 1 is a process diagram of turbo code encoding according to an embodiment of the present invention.

In this embodiment, which is shown in FIG. 1, the transmitted information is, for example, encoded with a turbo code for description. FIG. 1 is a process diagram of turbo code encoding at a ⅓ encoding rate. In this embodiment, the encoded information includes the three parts. The first part of the information is input original information bits, which may also be referred to as system bits. The second part of the information is output information of the input original information bits after being encoded by a component encoder 1. This second part of the information may also be referred to as check bits 1 or first check bits. The third part of the information is output information of the input original information bits after first being interlaced and then encoded by a component encoder 2. This third part of the information may also be referred to as check bits 2 or second check bits. In this embodiment, the number of bits of each part of the three parts of information is equal, and the number of bits equals the number of the input original information bits. The three parts of information are combined to be used as the final output information after turbo code encoding.

In this embodiment, rate matching needs to be performed on the final output information after the turbo code encoding is accomplished but before the final output information is transmitted, so as to select the information bits to be transmitted.

Figure 2:
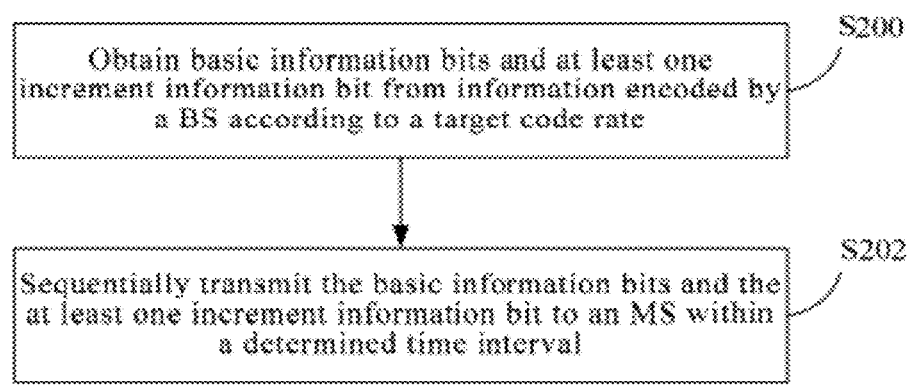
FIG. 2 is a flow chart of a method for transmitting information according to a target encoding rate according to an embodiment of the present invention.

FIG. 2 is a flow chart of a method for transmitting information according to a target encoding rate according to one embodiment of the present invention.

In this embodiment, a BS communicates with and is connected to multiple MSs, and the multiple MSs are located in different channel condition environments but may also be located in the same channel condition environment. The MSs in the same channel condition environment may correctly receive the information transmitted at the same or similar encoding rates, and the BS may transmit the information at the same or similar encoding rates at which the MSs may correctly receive the information in such an environment. In such a case, the encoding rate is referred to as a target encoding rate of the MS. As for the MSs in a good channel condition environment, the BS may use a relatively high encoding rate to transmit the information to the MSs and the MSs have a high probability of correctly receiving the information transmitted at such an encoding rate. As for the MSs in a bad or poor channel condition environment, the BS may use a relatively low encoding rate to transmit the information to the MSs, and the MSs have a high probability of correctly receiving the information transmitted at the relatively low encoding rate. The target encoding rate is an encoding rate used by the BS when the MS is capable of correctly decoding the information transmitted by the BS.

Step S200: In this embodiment, the BS obtains basic information bits and at least one incremental information bit from the information encoded by the BS according to the target encoding rate of the MS. This step may also be construed as performing rate matching according to the target encoding rate, the basic information bits, and the at least one incremental information bit, which are obtained from the encoded information.

In this embodiment, the basic information bits are a subset of all information bits selected during the rate matching process to meet the requirements of the maximum target encoding rate, and the incremental information bits are a subset of all information bits selected during the rate matching process to meet the requirements of other target encoding rates. In this embodiment, the basic information bits and the incremental information bits are selected by using different target encoding rates.

In this embodiment, the obtaining the basic information bits and the incremental information bits may include the following steps.

AA: Interlace the three parts of information after turbo code encoding. In this step, the three parts of information, that is, system bits, check bits 1 and check bits 2, may be generated after the BS completes the turbo code encoding; and during the interlacing process, the system bits are interlaced first, and then the check bits 1 and the check bits 2 are interlaced.

BB: Duplicate the interlaced information bits.

CC: Obtain the basic information bits according to the target encoding rate. In this step, the target encoding rates in multiple MSs are sorted, and the basic information bits are obtained from the encoded information bits according to a target encoding rate with the maximum value.

In this embodiment, the BS communicates with and is connected to, for example, six MNs for description. A first MS and a second MS are in the same or similar channel condition environments, and target encoding rates of the first MS and the second MS are the same or similar in such an environment, which may be V1; a third MS and a fourth MS are in the same or similar channel condition environments, and target encoding rates of the third MS and the fourth MS are the same or similar in such an environment, which may be V2; and a fifth MS and a sixth MS are in the same or similar channel condition environments, and target encoding rates of the fifth MS and the sixth MS are the same or similar in such an environment, which may be V3. In this embodiment, it is assumed that V1>V2>V3, that is, V1 is the maximum target encoding rate.

In this embodiment, the basic information bits are obtained according to the maximum target encoding rate, that is, the basic information bits are obtained according to V1. The start bit of the basic information bits in the interlaced information bits is first calculated, and then the length of the basic information bits is obtained according to a constraint relation between the original information bits and the basic information bits. In this embodiment, the constraint relation between the original information bits and the basic information bits is that, a ratio of the length of the original information bits to the length of the basic information bits is equal to the target encoding rate V1. Therefore, the basic information bits may be obtained from the interlaced information bits according to the start bit and the length.

DD: Obtain at least one incremental information bit according to the target encoding rate. In this embodiment, the corresponding incremental information bits are sequentially obtained from the encoded information bits according to the size of the values of the remaining target encoding rates. Since V1>V2, the third MS and the fourth MS need to receive the basic information bits and the incremental information bit that is obtained according to V2. In this embodiment, the stop bit of the basic information bits may be used as the start bit of the incremental information bits, and then the length of the incremental information bits is obtained according to a constraint relation among the original information bits, the basic information bits and the incremental information bits. In this embodiment, the constraint relation among the original information bits, the basic information bits and the incremental information bits is that, a ratio of the length of the original information bits to a sum of the length of the basic information bits and the length of the incremental information bits is equal to the target encoding rate V2. Since the length of the basic information bits is obtained in step CC, the length of the incremental information bits may be obtained according to the foregoing constraint relation. In this embodiment, since the third MS and the fourth MS have the second highest target encoding rate, the third MS and the fourth MS only need to receive one incremental information bit.

Since V1>V2>V3, the fifth MS and the sixth MS need to receive the basic information bits, the incremental information bit that is obtained according to V2, and the incremental information bit that is obtained according to V3. In this embodiment, the stop bit of the incremental information bit that is obtained according to V2 may be used as the start bit of the incremental information bit that is obtained according to V3, and then the length of the incremental information bits is obtained according to a constraint relation among the original information bits, the basic information bits, the incremental information bit that is obtained according to V2 and the incremental information bit that is obtained according to V3. In this embodiment, the constraint relation among the original information bits, the basic information bits, the incremental information bit that is obtained according to V2 and the incremental information bit that is obtained according to V3 is that, a ratio of the length of the original information bits to a sum of the length of the basic information bits, the length of the incremental information bit that is obtained according to V2 and the length of the incremental information bit that is obtained according to V3 is equal to the target encoding rate V3. In this embodiment, since the fifth MS and the sixth MS have the lowest target encoding rate, the fifth MS and the sixth MS need to receive two incremental information bits.

When more target encoding rates exist, the corresponding target information bits and multiple incremental information bits may be obtained according to the foregoing description.

Figure 3:
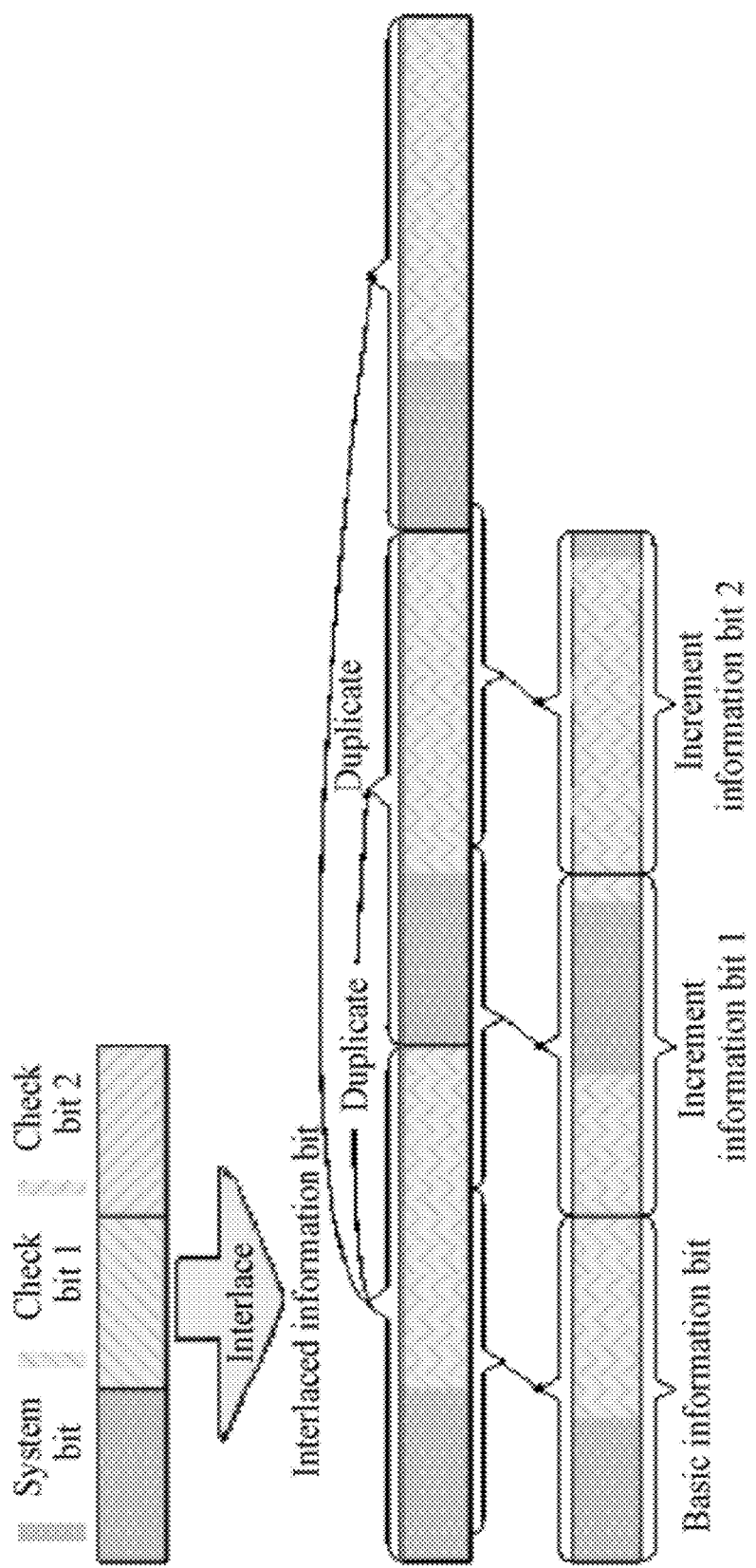
FIG. 3 is a first schematic diagram of obtaining basic information bits and incremental information bits according to an embodiment of the present invention.
Figure 4:
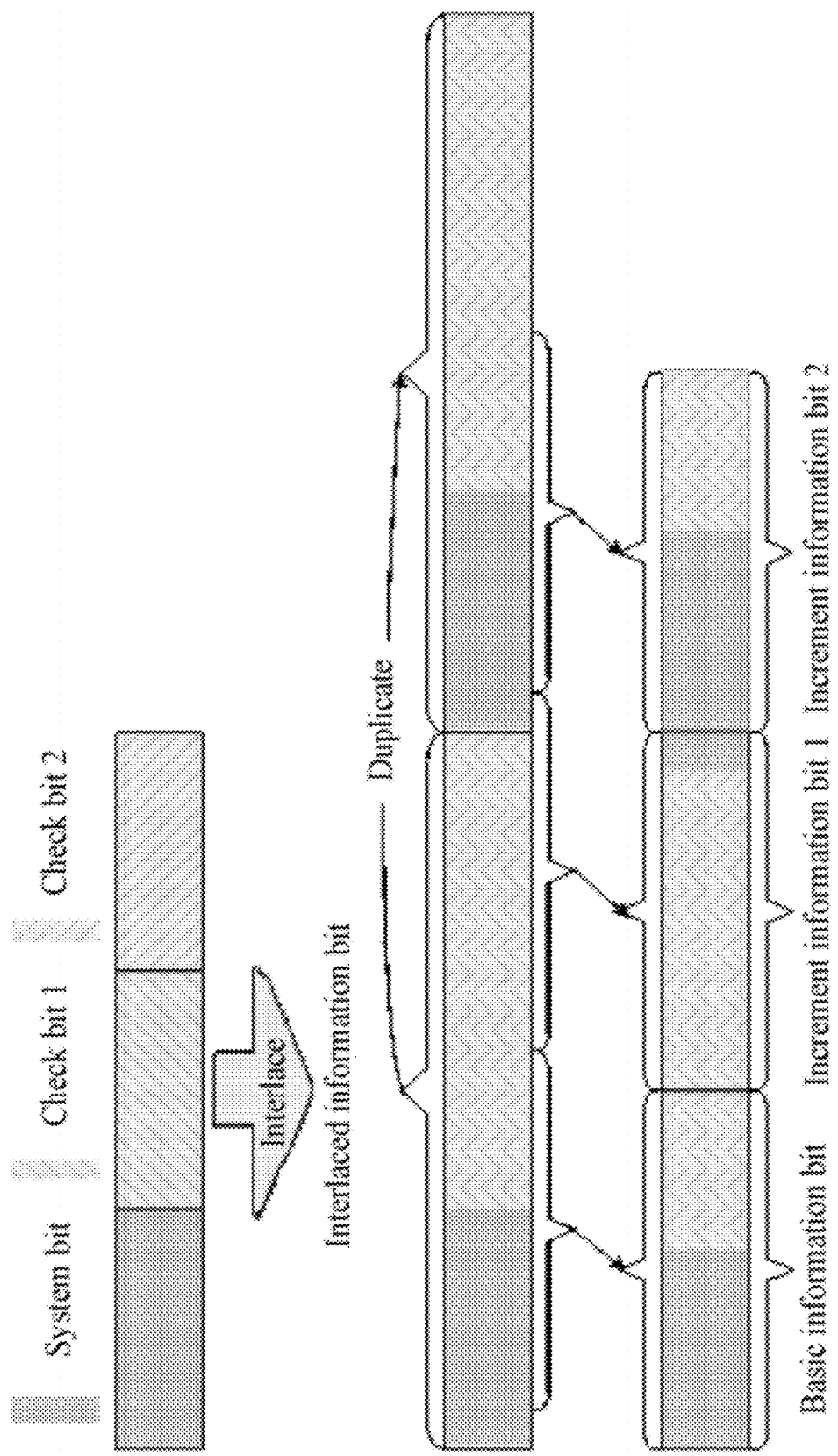
FIG. 4 is a second schematic diagram of obtaining basic information bits and incremental information bits according to an embodiment of the present invention.

In this embodiment, as for the process of obtaining the basic information bits and the incremental information bits, reference may be made to FIG. 3 and FIG. 4. In FIG. 3, V1 is ½, V2 is ¼, and V3 is ⅙, and in FIG. 4, V1 is ⅔, V2 is ⅓, and V3 is ⅖. Definitely, V1, V2 and V3 are described by way of example only, and it is required to obtain the corresponding target encoding rate according to the actual network conditions.

Figure 5:
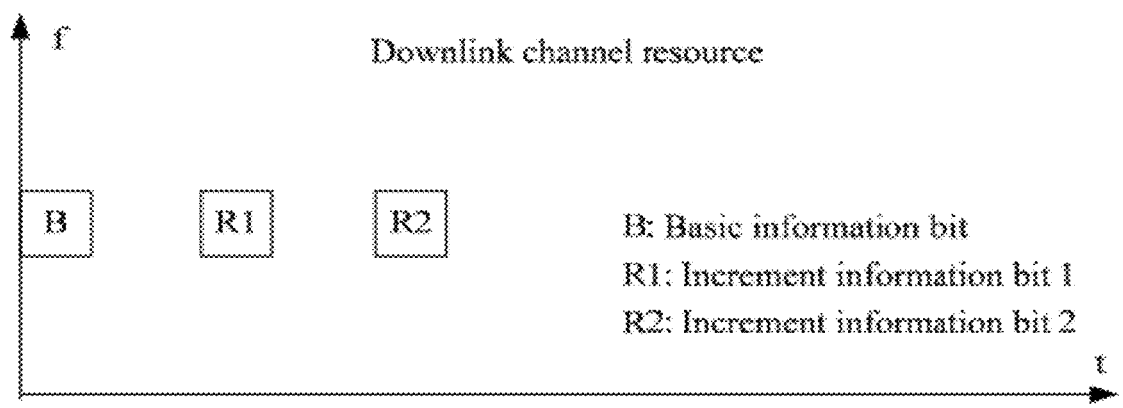
FIG. 5 is a first schematic diagram of transmitting basic information bits and incremental information bits according to an embodiment of the present invention.
Figure 6:
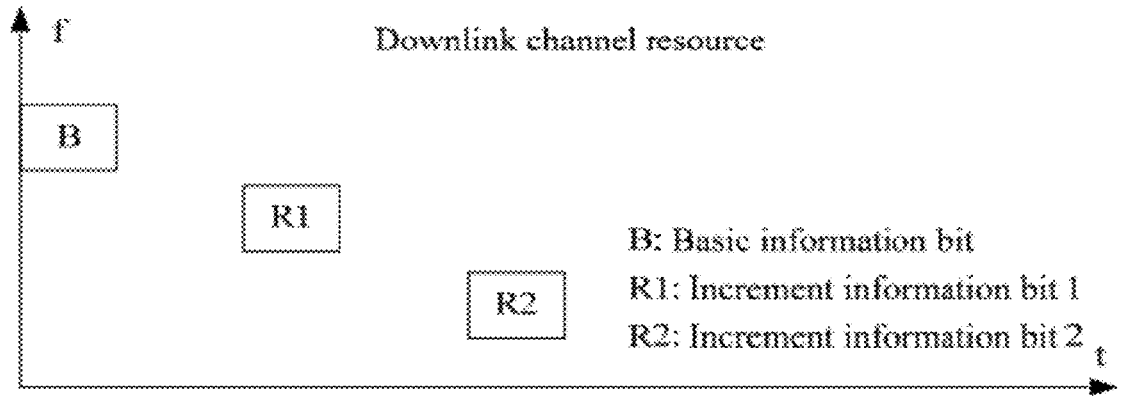
FIG. 6 is a second schematic diagram of transmitting basic information bits and incremental information bits according to an embodiment of the present invention.

Step S202: Sequentially transmit the basic information bits and the at least one incremental information bit to the MS within a determined time interval on time frequency resources. In this embodiment, the BS may select, according to the current channel conditions, appropriate time frequency resources to transmit the basic information bits and the at least one incremental information bit, and may sequentially transmit the basic information bits and the at least one incremental information bit within a determined time interval of 4 ms. Definitely, the determined time interval may also be determined according to the time which is required when the MS decodes the basic information bits and the incremental information bits. In this embodiment, 4 ms is only an example, and persons skilled in the art may adjust the interval according to the actual channel network condition. In this embodiment, multiple manners may be adopted for transmitting the basic information bits and the at least one incremental information bit on time frequency resources. Referring to FIG. 5 and FIG. 6, FIG. 5 and FIG. 6 respectively illustrate one of the transmission manners. In FIG. 6, the basic information bits and the incremental information bits respectively occupy different time resources, and the positions of the occupied frequency resources are also staggered.

In this embodiment, the MS in a good channel condition environment may implement correct decoding after receiving the basic information bits only, and does not need to receive the incremental information bits after performing correct decoding. In this way, the MS in the good channel condition environment does not keep a radio frequency receiving state all the time, and also does not generate redundancies, thereby reducing the power consumption. Since the target encoding rate that can be accepted by the MS in a bad or poor information condition environment is relatively low, after the basic information bits are received, the MS needs to further receive one or more incremental information bits, and then decode the information bits. After correct decoding is performed, it is unnecessary to further receive more incremental information bits. In this way, the MS in the good channel condition environment does not keep a radio frequency receiving state all the time, and also does not generate redundancies, thereby reducing the power consumption.

In this embodiment, when the BS transmits the information, the information may be transmitted through broadcast or multicast, which will be respectively described in the following.

Figure 7:
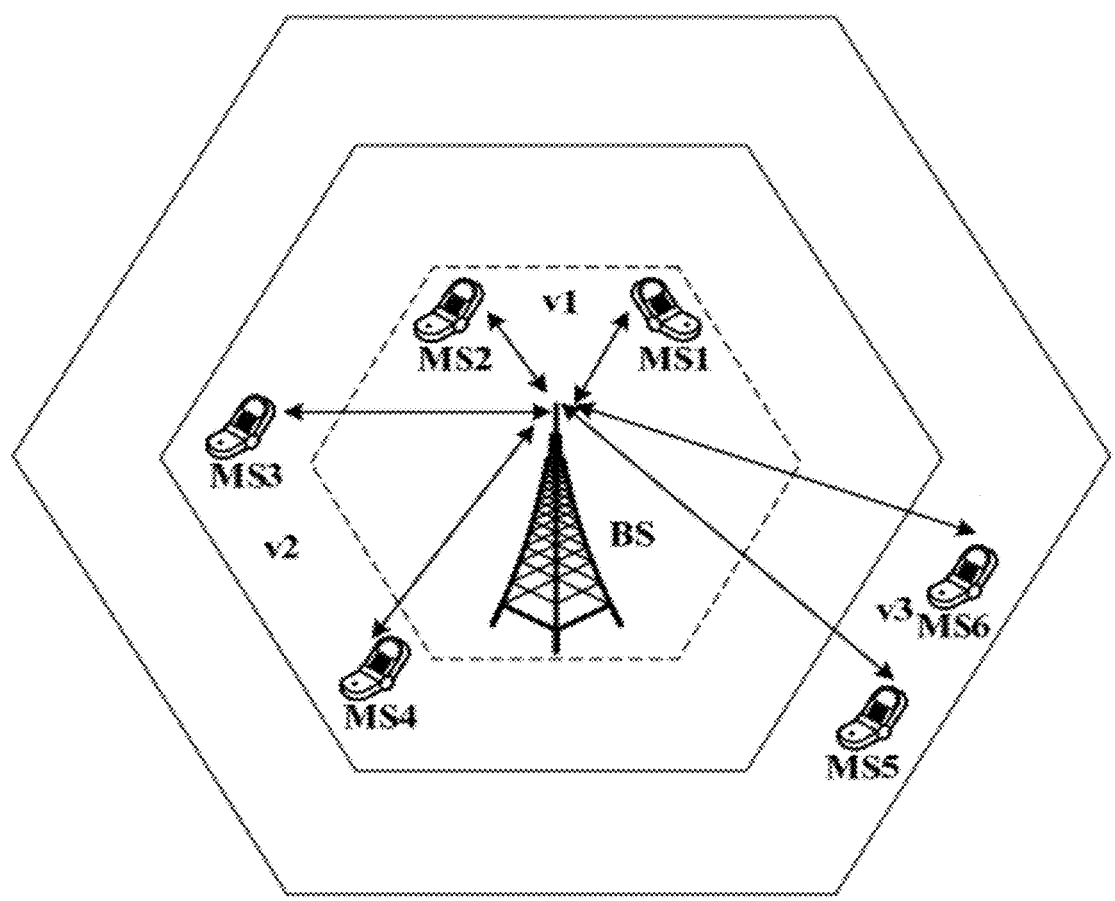
FIG. 7 is a schematic diagram of transmitting broadcast information according to an embodiment of the present invention.

1. When the information is transmitted through broadcast, the BS groups, according to network plan conditions in a broadcast system, the MSs that receive the broadcast information, divides the MSs with equivalent channel quality into one group, and applies the same target encoding rate to the MSs in the same group. Taking FIG. 7 as an example for description, in FIG. 7, dotted lines are used as division lines, the MSs in the range defined by the dotted lines fall within the same group, that is, MS1 and MS2 are in the same group, MS3 and MS4 are in the same group, and MS5 and MS6 are in the same group, and the target encoding rates of the three groups are different, which are respectively set to V1, V2 and V3, and are in a descending order, that is, V1>V2>V3.

After the BS performs turbo code encoding on the broadcast information to be transmitted, the BS performs the rate matching on the encoded information bits according to V1, so as to obtain the basic information bits, and then, after the BS performs the rate matching on the encoded information bits according to V2 and V3, the BS respectively generates an incremental information bit 1 and an incremental information bit 2. As for this process, reference may be made to step S200, FIG. 3 and FIG. 4.

Figure 8:
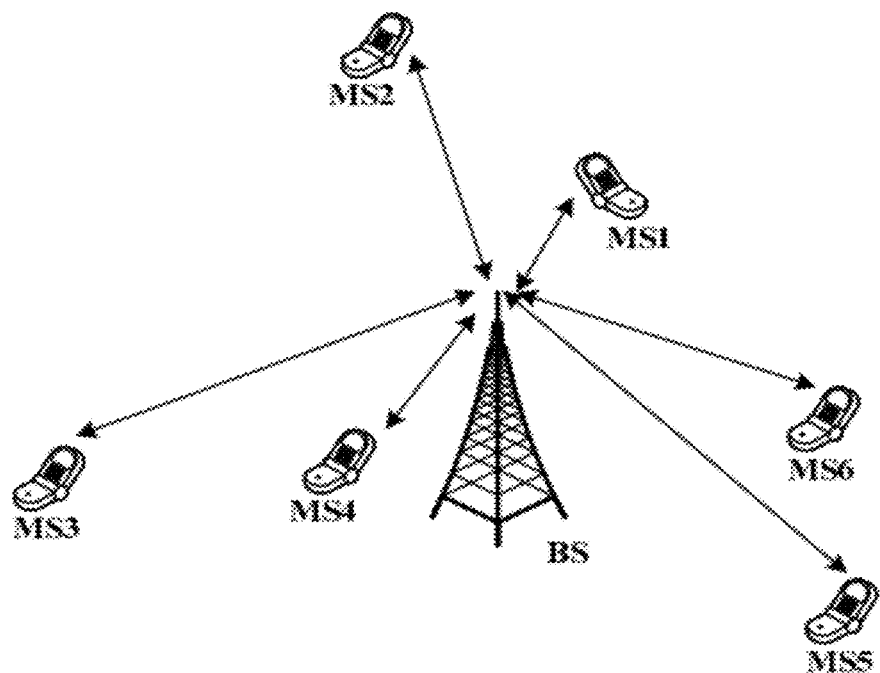
FIG. 8 is a schematic diagram of transmitting multicast information according to an embodiment of the present invention.

2. When the information is transmitted through multicast, the MSs in the multicast group first respectively measure the quality of downlink channels from the BS to the MSs, and feed back a measurement result to the BS, and then, the BS determines the target encoding rates according to the downlink channel quality, groups the MSs in the multicast group, and applies the same target encoding rate to the MSs in the same group. Taking FIG. 8 as an example for description, in FIG. 8, 6 MSs that need to receive the multicast information exist, the BS groups the 6 MSs according to the downlink channel quality, that is, MS1 and MS4 belong to a group 1, MS2 and MS6 belong to a group 2, and MS3 and MS5 belong to a group 3, and the target encoding rates of the three groups are different, which are respectively set to V1, V2 and V3, and are in a descending order, that is, V1>V2>V3.

After the BS performs turbo code encoding on the multicast information that needs to be transmitted, the BS performs the rate matching on the encoded information bits according to V1, so as to obtain the basic information bits, and then, after the BS performs the rate matching on the encoded information bits according to V2 and V3, the BS respectively generates an incremental information bit 1 and an incremental information bit 2. As for this process, reference may be made to step S200, FIG. 3 and FIG. 4. In the multicast system, the length of the basic information bits may be equal to or not equal to the length of the incremental information bits, but the basic information bits and the incremental information bits should both use a basic unit of system resource scheduling as a minimum unit, and the length of the basic information bits and the length of the incremental information bits are respectively an integral multiple of the length of the basic unit.

When the BS transmits the multicast information, the MS may feed back whether the basic information bits and the incremental information bits transmitted by the BS can be correctly decoded. After the MS feeds back the decoding result to the BS, the BS may adjust the target encoding rate according to the result fed back by the MS, and obtains the basic information bits and the incremental information bits again. If in a period of time, all the MSs feed back an acknowledgment (ACK) after receiving the basic information bits, the BS only needs to transmit the basic information bits, and does not need to transmit the incremental information bits. In this way, on one hand, the BS's resources that are occupied for transmitting the incremental information bits may be saved. If only a certain MS feeds back a negative acknowledgment (NACK), the BS may retransmit the basic information bits and the incremental information bits for the MS.

Figure 9:
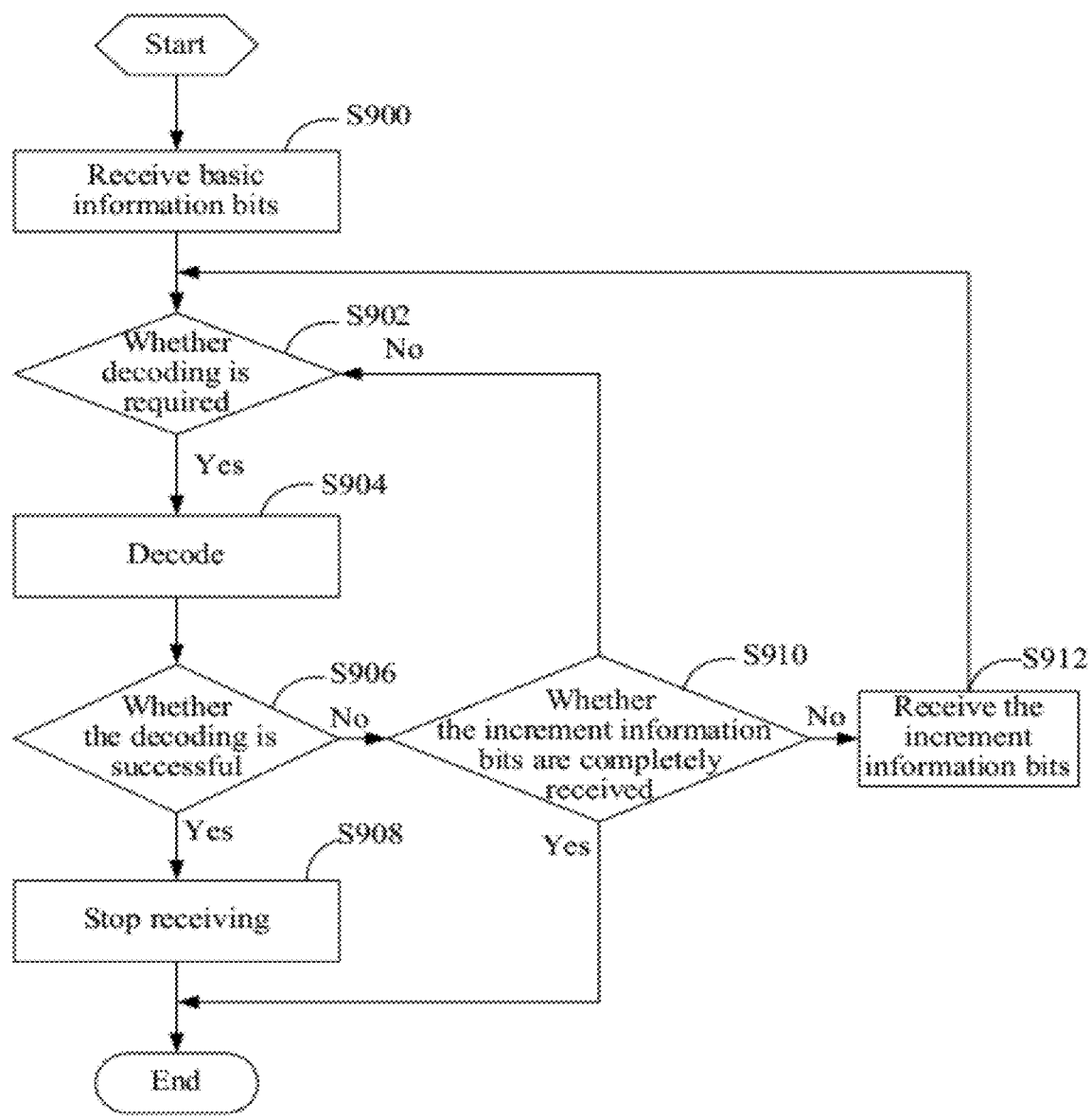
FIG. 9 is a first flow chart of a method for receiving information transmitted by a BS according to an embodiment of the present invention.

In this embodiment, since the BS may transmit broadcast information or multicast information, the MS applies different receiving processes. The difference lies in that, when the BS transmits the broadcast information, the MS does not need to feed back an ACK or NACK; and when the BS transmits the multicast information, the MS needs to feed back an ACK or NACK. FIG. 9 is a first flow chart of a method for receiving information transmitted by a BS according to an embodiment of the present invention, that is, a flow chart of receiving broadcast information.

Step S900: In this embodiment, receive basic information bits. In this embodiment, no matter the MS is in a good channel condition environment or is in a bad channel condition environment, the MS needs to receive the basic information bits.

Step S902: Determine whether decoding is required within a determined time interval. In this embodiment, the determined time interval here is the same as the determined time interval of sequential transmission by the BS, which may be 4 ms. Definitely, the determined time interval may also be determined according to the time which is required when the MS decodes the basic information bits and the incremental information bits. In this embodiment, 4 ms is only an example, and persons skilled in the art may adjust the interval according to the actual channel network condition. In this embodiment, the MS may set a corresponding decoding triggering threshold according to the channel condition of the MS. If the current channel condition is greater than the set threshold, step S904 is performed, and if the current channel condition is not greater than the set threshold, step S910 is performed. In this embodiment, the MS may also set the decoding triggering threshold according to factors such as an encoding rate, the size or length of an encoding interlacing block, the channel conditions, a decoding algorithm, decoding iteration times, and a service quality level of the MS. Table 1 illustrates reference decoding triggering thresholds corresponding to several different encoding rates in the case that the size of a turbo encoding interleaver is 640, and the max-log-map algorithm is used to ensure that a Bit Error Rate (BER) of encoding of the MS is not greater than $10^{-1}$ in a Raileigh Fading channel.

| Code rate | 1/4 | 1/3 | 1/2 | 2/3 | 3/4 | 4/5 | 1 |
|---|---|---|---|---|---|---|---|
| Threshold (db) | 0.58 | 2.39 | 5.36 | 8.52 | 9.04 | 9.69 | 12.31 |

Table 1 illustrates decoding triggering thresholds of the MS.

Step S904: Decode the received information bits. In this embodiment, within the determined time interval, the received basic information bits are decoded. Definitely, within the determined time interval, the received basic information bits and incremental information bits may be also decoded.

Step S906: Determine whether the decoding is successful within the determined time interval. In this embodiment, if the decoding is successful, step S908 is performed, and if the decoding is not successful, step S910 is performed.

Step S908: Stop receiving the information transmitted by the BS. In this embodiment, the receiving of the incremental information bits obtained from the information encoded by the BS according to the target encoding rate and sequentially transmitted by the BS within the determined time interval is stopped.

After step S908 is performed, the MS ends the whole receiving process.

Step S910: Determine whether the incremental information bits are completely received. In this embodiment, if it is determined that the incremental information bits are completely received, it indicates that after the MS receives the basic information bits and the incremental information bits transmitted by the BS, the MS still cannot decode the information bits, and can only end the receiving process. If it is determined that the incremental information bits are not completely received, step S912 is performed, and it indicates that the MS cannot successfully decode the information bits according to the currently received basic information bits, and the incremental information bits are required for decoding, or it indicates that the MS cannot successfully decode the information bits according to the currently received basic information bits and a part of the incremental information bits, and more incremental information bits are required for decoding.

Step S912: Receive the incremental information bits.

After step S912 is performed, step S902 is continuously performed.

In this embodiment, if the MS may implement correct decoding after receiving the basic information bits, it is unnecessary to further receive the incremental information bits, and in this way, the MS does not keep a radio frequency receiving state all the time, and also does not generate redundancies, thereby reducing the power consumption. If the MS is capable of implement correct decoding after receiving the basic information bits and partial incremental basic information, it is unnecessary to receive more incremental information bits, and in this way, the MS does not keep the radio frequency receiving state all the time, and also does not generate redundancies, thereby reducing the power consumption.

Figure 10:
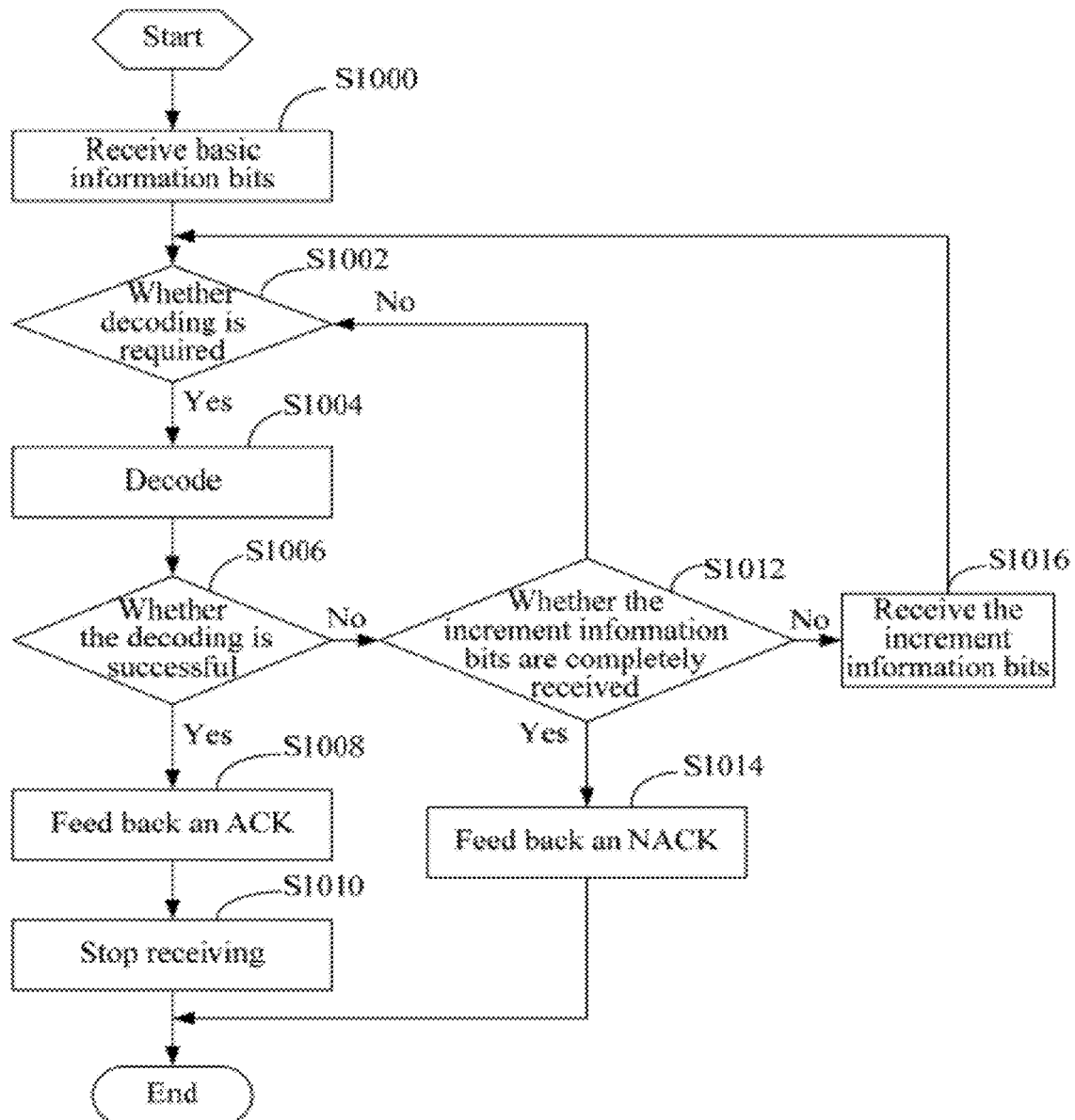
FIG. 10 is a second flow chart of a method for receiving information transmitted by a BS according to an embodiment of the present invention.

FIG. 10 is a second flow chart of a method for receiving information transmitted by a BS according to an embodiment of the present invention, that is, a flow chart of receiving multicast information.

Step S1000: In this embodiment, receive basic information bits. In this embodiment, no matter the MS is in a good channel condition environment or is in a bad channel condition environment, the MS needs to receive the basic information bits.

Step S1002: Determine whether decoding is required within a determined time interval.

Step S1004: Decode the received information bits. In this embodiment, within the determined time interval, the received basic information bits are decoded. Definitely, the received basic information bits and incremental information bits may also be decoded.

Step S1006: Determine whether the decoding is successful within the determined time interval. In this embodiment, if the decoding is successful, step S1008 is performed, and if the decoding is not successful, step S1012 is performed.

Step S1008: Feed back an ACK signal to the BS. In this embodiment, the ACK signal is fed back to the BS to inform the MS that the multicast information transmitted by the BS may be successfully decoded, and it is unnecessary to transmit the remaining multicast information.

Step S1010 is then performed to stop receiving the multicast information, and the whole receiving process is ended.

Step S1012: Determine whether the incremental information bits are completely received. In this embodiment, if it is determined that the incremental information bits are completely received, step S1014 is performed to feed back an NACK signal to the BS, which indicates that after the MS receives the basic information bits and the incremental information bits transmitted by the BS, the MS still cannot decode the information bits, and can only end the receiving process, and the BS may retransmit the basic information bits and the incremental information bits for the MS. If it is determined that the incremental information bits are not completely received, step S1016 is performed, and it indicates that the MS cannot successfully decode the information bits according to the currently received basic information bits, and the incremental information bits are required for decoding, or it indicates that the MS cannot successfully decode the information bits according to the currently received basic information bits and a part of the incremental information bits, and more incremental information bits are required for decoding.

Step S1016: Receive the incremental information bits.

After step S1016 is performed, step S1002 is continuously performed.

In this embodiment, if the MS may implement correct decoding after receiving the basic information bits, it is unnecessary to further receive the incremental information bits, and in this way, the MS does not keep a radio frequency receiving state all the time, and also does not generate redundancies, thereby reducing the power consumption. If the MS is capable of implementing correct decoding after receiving the basic information bits and partially incremented basic information, it is unnecessary to receive more incremental information bits, and in this way, the MS does not keep the radio frequency receiving state all the time, and also does not generate redundancies, thereby reducing the power consumption.

After the MS feeds back the decoding result to the BS, the BS may adjust the target encoding rate according to the result fed back by the MS, and obtains the basic information bits and the incremental information bits again. If in a period of time, each of the MSs feeds back an ACK after receiving the basic information bits, the BS only needs to transmit the basic information bits, and does not need to transmit the incremental information bits. In this way, on one hand, the BS's resources that are occupied for transmitting the incremental information bits may be saved. If only a certain MS feeds back an NACK, the BS may retransmit the basic information bits and the incremental information bits for the MS.

Figure 11:
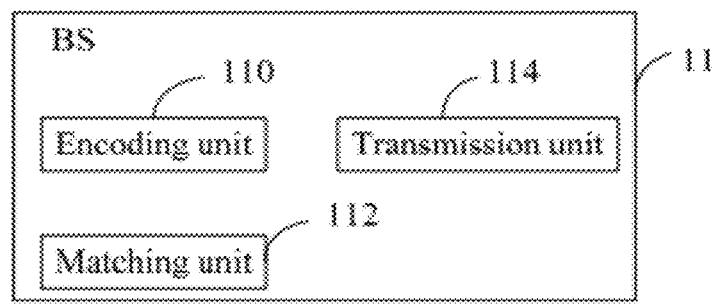
FIG. 11 is a first structure diagram of a BS according to an embodiment of the present invention.

FIG. 11 is a first structure diagram of a BS according to an embodiment of the present invention. In this embodiment, the BS 11 is used for transmitting broadcast information, and may communicate with and be connected to multiple MSs, and the multiple MSs are located in different channel condition environments, and definitely may also be located in the same channel condition environment. The MSs in the same channel condition environment may correctly receive the information transmitted at the same encoding rate, and the BS may transmit the information at the same encoding rate at which the MSs may correctly receive the information in such an environment. In such a case, the encoding rate is referred to as a target encoding rate of the MS. As for the MSs in a good channel condition environment, the BS may use a relatively high encoding rate to transmit the information to the MSs in such a good channel condition environment, and the MS may correctly receive the information transmitted at such an encoding rate. As for the MSs in a bad or poor channel condition environment, the BS may use a relatively low encoding rate to transmit the information to the MSs in such a good channel condition environment, and the MS may correctly receive the information transmitted at such an encoding rate.

In this embodiment, the BS groups, according to network plan conditions in a broadcast system, the MSs that receives the broadcast information, divides the MSs with equivalent channel quality into one group, and applies the same target encoding rate to the MSs in the same group.

The BS 11 includes an encoding unit 110, a matching unit 112 and a transmission unit 114. In this embodiment, the encoding unit 110 is configured to perform turbo code encoding on the broadcast information. In this embodiment, the encoded information bits include system bits, first check bits and second check bits.

The matching unit 112 is configured to obtain basic information bits and at least one incremental information bit from the encoded information bits according to a target encoding rate. In this embodiment, the matching unit 112 may sort the target encoding rates in multiple MSs, obtain the basic information bits from the encoded information bits according to a target encoding rate with the maximum value, and then sequentially obtain the corresponding incremental information bits from the encoded information bits according to the size of the values of the remaining target encoding rates. In this embodiment, the basic information bits may be obtained according to a constraint relation between original information bits and the basic information bits, and the constraint relation between the original information bits and the basic information bits is that, a ratio of the length of the original information bits to the length of the basic information bits is equal to the target encoding rate with the maximum value. In this embodiment, the incremental information bits may be obtained according to a constraint relation among the original information bits, the basic information bits and the incremental information bits, and the constraint relation among the original information bits, the basic information bits and the incremental information bits is that, a ratio of the length of the original information bits to a sum of the length of the basic information bits and the length of the incremental information bits is equal to the remaining target encoding rate.

As for the specific process of obtaining the basic information bits and the at least one incremental information bit, reference may be made to step S200, which will not be described herein again.

The transmission unit 114 is configured to sequentially transmit the basic information bits and the at least one incremental information bit within a determined time interval on time frequency resources. In this embodiment, the BS may select appropriate time frequency resources to transmit the basic information bits and the at least one incremental information bit according to the current channel conditions, and may sequentially transmit the basic information bits and the at least one incremental information bit within a determined time interval of 4 ms. Definitely, the determined time interval may also be determined according to the time which is required when the MS decodes the basic information bits and the incremental information bits. In this embodiment, all the MSs may receive the basic information bits and the incremental information bit.

Figure 12:
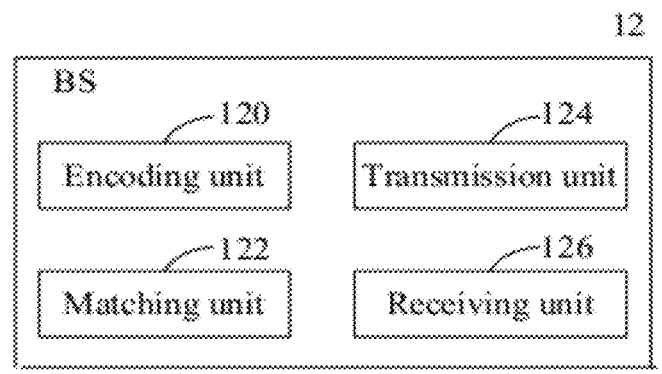
FIG. 12 is a second structure diagram of a BS according to an embodiment of the present invention.

FIG. 12 is a second structure diagram of a BS according to an embodiment of the present invention. In this embodiment, the BS 12 is used for transmitting multicast information, and at this time, MSs in a multicast group first respectively measure the quality of downlink channels from the BS to the MSs, and feed back a measurement result to the BS, and then, the BS determines target encoding rates according to the downlink channel quality, groups the MSs in a multicast group, and applies the same target encoding rate to the MSs in the same group.

The BS 12 includes an encoding unit 120, a matching unit 122, a transmission unit 124 and a receiving unit 126. In this embodiment, the encoding unit 120, the matching unit 122, and the transmission unit 124 have the same functional structures as the encoding unit 110, the matching unit 112, and the transmission unit 114 in FIG. 11, which will not be described herein again. The receiving unit 126 is configured to receive a decoding feedback result transmitted by the MS.

An adjustment unit 128 is configured to adjust an information transmission policy according to the decoding feedback result. In this embodiment, if in a period of time, the adjustment unit 128 learns that each of the MSs feeds back an ACK after receiving basic information bits, the adjustment unit 128 informs the transmission unit 126 that the transmission unit 126 only needs to transmit the basic information bits, and does not need to transmit incremental information bits. In this way, on one hand, the BS's resources that are occupied for transmitting the incremental information bits may be saved. If only a certain MS feeds back an NACK, the transmission unit 126 may be instructed to retransmit the basic information bits and the incremental information bits for the MS.

In this embodiment, the MS in a good channel condition environment may implement correct decoding after receiving the basic information bits only, and does not need to receive the incremental information bits after performing correct decoding. In this way, the MS in the good channel condition environment does not keep a radio frequency receiving state all the time, and also does not generate redundancies, thereby reducing the power consumption. Since the target encoding rate that can be accepted by the MS in a bad or poor information condition environment is low, after the MS receives the basic information bits, the MS needs to further receive one or more incremental information bits, and then decode the information bits. After correct decoding is performed, it is unnecessary to further receive more incremental information bits. In this way, the MS in the good channel condition environment does not keep a radio frequency receiving state all the time, and also does not generate redundancies, thereby reducing the power consumption.

After the MS feeds back the decoding result to the BS, the BS may adjust the target encoding rate according to the result fed back by the MS, and obtains the basic information bits and the incremental information bits again. If in a period of time, each of the MSs feeds back an ACK after receiving the basic information bits, the BS only needs to transmit the basic information bits, and does not need to transmit the incremental information bits. In this way, on one hand, the BS's resources that are occupied for transmitting the incremental information bits may be saved. If only a certain MS feeds back an NACK, the BS may retransmit the basic information bits and the incremental information bits for the MS.

Figure 13:
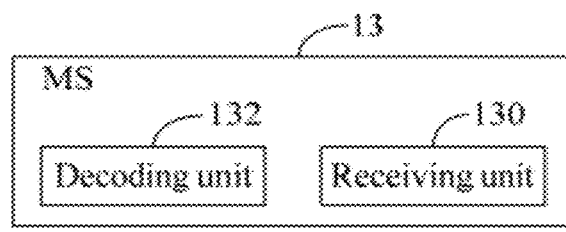
FIG. 13 is a first structure diagram of an MS according to an embodiment of the present invention.

FIG. 13 is a first structure diagram of an MS according to an embodiment of the present invention. In this embodiment, an MS 13 is configured to receive broadcast information transmitted by a BS.

In this embodiment, the MS 13 includes a receiving unit 130 and a decoding unit 132. In this embodiment, the receiving unit 130 is configured to receive information bits transmitted by a BS. In this embodiment, since the BS sequentially transmits basic information bits and at least one incremental information bit within a determined time interval on time frequency resources, the receiving unit 130 first receives the basic information bits at the beginning, and after a period of time, receives the incremental information bit.

The decoding unit 132 is configured to decode the received information bits within a determined time interval. In this embodiment, the determined time interval here is the same as the determined time interval of sequential transmission by the BS, which may be 4 ms. Definitely, the determined time interval may also be determined according to the time which is required when the MS decodes the basic information bits and the incremental information bits. In this embodiment, 4 ms is only an example, and persons skilled in the art may adjust the interval according to the actual channel network condition. In this embodiment, the decoding unit 132 is further configured to first determine whether decoding is required, and decode the information bits received by the receiving unit 130 if decoding is required. In this embodiment, the decoding unit 132 may set a corresponding decoding triggering threshold according to the channel condition of the MS. Since the receiving unit 130 first receives the basic information bits, the basic information bits are decoded first. If the decoding is successful within the determined time interval, the receiving unit 130 is instructed to stop receiving the information bits transmitted by the BS. In this embodiment, the receiving of the incremental information bits obtained from the information encoded by the BS according to the target encoding rate and sequentially transmitted by the BS within the determined time interval is stopped. If the decoding is unsuccessful, the receiving unit 130 is instructed to continue to receive the incremental information bits transmitted by the BS, or it is unnecessary to inform the receiving unit 130, and the receiving unit 130 automatically continues to receive the information bits. After the receiving unit 130 receives the incremental information bits, if the decoding unit 132 decodes the basic information bits and the received incremental information bits, and the decoding is successful, the receiving unit 130 is instructed to stop receiving the information bits; if the decoding is unsuccessful, the receiving unit 130 is instructed to continue to receive the incremental information bits, and at this time, the receiving unit 130 is further configured to determine whether the incremental information bits are completely received. In this embodiment, it is determined whether the incremental information bits are received in a long period of time, and if no incremental information bits are received, the receiving unit 130 determines that the incremental information bits are completely received. At this time, after the MS receives the basic information bits and the incremental information bits transmitted by the BS, the MS still cannot decode the information bits, and can only end the receiving process. If it is determined that the incremental information bits may be further received, the decoding unit 132 continuously decodes the information bits.

In this embodiment, if the MS may implement correct decoding after receiving the basic information bits, it is unnecessary to further receive the incremental information bits, and in this way, the MS does not keep a radio frequency receiving state all the time, and also does not generate redundancies, thereby reducing the power consumption. If the MS is capable of implement correct decoding after receiving the basic information bits and partial increment basic information, it is unnecessary to receive more incremental information bits, and in this way, the MS does not keep the radio frequency receiving state all the time, and also does not generate redundancies, thereby reducing the power consumption.

Figure 14:
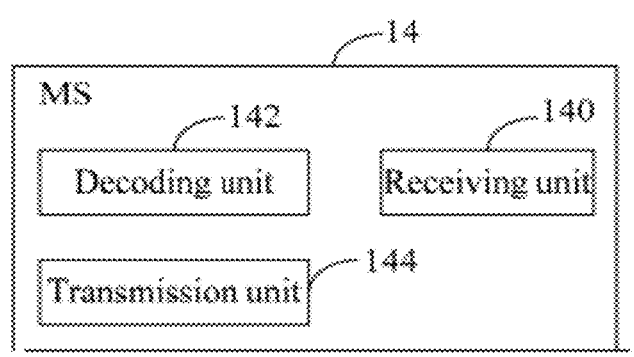
FIG. 14 is a second structure diagram of an MS according to an embodiment of the present invention.

FIG. 14 is a second structure diagram of an MS according to an embodiment of the present invention. In this embodiment, a receiving unit 140 and a decoding unit 142 in FIG. 14 have the same functional structures as the receiving unit 130 and the decoding unit 132 in FIG. 13, which will not be described herein again. In this embodiment, an MS 14 is configured to receive multicast information transmitted by a BS.

The difference lies in that, a transmission unit 144 is added in FIG. 14, which is configured to feed back an ACK signal to the BS if the decoding unit 142 successfully decodes the information bits. In this embodiment, the ACK signal is fed back to the BS to inform the MS that the multicast information transmitted by the BS may be successfully decoded, and it is unnecessary to transmit the remaining multicast information.

The transmission unit 144 is further configured to transmit an NACK signal to the BS if the decoding unit 142 fails to decode the basic information bits and all the incremental information bits received by the receiving unit 140. That is to say, after the MS receives the basic information bits and the incremental information bits transmitted by the BS, the MS still cannot decode the information bits, and can only end the receiving process, and the BS may retransmit the basic information bits and the incremental information bits for the MS.

In this embodiment, if the MS may implement correct decoding after receiving the basic information bits, it is unnecessary to further receive the incremental information bits, and in this way, the MS does not keep a radio frequency receiving state all the time, and also does not generate redundancies, thereby reducing the power consumption. If the MS is capable of implement correct decoding after receiving the basic information bits and partial increment basic information, it is unnecessary to receive more incremental information bits, and in this way, the MS does not keep the radio frequency receiving state all the time, and also does not generate redundancies, thereby reducing the power consumption.

After the MS feeds back the decoding result to the BS, the BS may adjust the target encoding rate according to the result fed back by the MS, and obtains the basic information bits and the incremental information bits again. If in a period of time, each of the MSs feeds back an ACK after receiving the basic information bits, the BS only needs to transmit the basic information bits, and does not need to transmit the incremental information bits. In this way, on one hand, the BS's resources that are occupied for transmitting the incremental information bits may be saved. If only a certain MS feeds back an NACK, the BS may retransmit the basic information bits and the incremental information bits for the MS.

Persons of ordinary skill in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a magnetic disk, an optical disk, a read-only memory (ROM), or a random access memory (RAM).

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications or equivalent replacements can be made to the technical solutions of the present invention, as long as such modifications or equivalent replacements do not depart from the spirit and scope of the present invention.

What is claimed is:

1. A method for transmitting information according to a target encoding rate, comprising:
    obtaining basic information bits and at least one incremental information bit from information encoded by a base station (BS) according to the target encoding rate; and
    sequentially transmitting the basic information bits and the at least one incremental information bit to a mobile station (MS) within a determined time interval;
    wherein the target encoding rate is an encoding rate used by the BS for which the MS is capable of correctly decoding information transmitted by the BS; and
    wherein the at least one incremental information bit is an information bit selected for meeting requirements of other target encoding rates.

2. The method according to claim 1, wherein the basic information bits are information bits selected for meeting requirements of a maximum target encoding rate.

3. The method according to claim 1, wherein the obtaining basic information bits and at least one incremental information bit from the information encoded by the BS according to the target encoding rate comprises:
    obtaining target encoding rates of multiple MSs;
    obtaining the basic information bits according to the target encoding rate with a maximum value in the target encoding rates of the multiple MSs; and
    obtaining the at least one incremental information bit according to at least one of the remaining target encoding rates in the target encoding rates of the multiple MSs.

4. The method according to claim 3, wherein the obtaining the basic information bits according to the target encoding rate with the maximum value comprises:
    performing turbo code encoding on original information bits that need to be transmitted;
    interlacing the encoded information; and
    obtaining the basic information bits from the interlaced information according to a constraint relation between the original information bits and the basic information bits, wherein the constraint relation between the original information bits and the basic information bits is that a ratio of length of the original information bits to length of the basic information bits is equal to the target encoding rate with the maximum value.

5. The method according to claim 3, wherein the obtaining the at least one incremental information bit according to the remaining target encoding rate comprises:
    performing turbo code encoding on original information bits that need to be transmitted;
    interlacing the encoded information; and
    obtaining the incremental information bits from the interlaced information according to a constraint relation among the original information bits, the basic information bits, and the incremental information bits;
    wherein the constraint relation among the original information bits, the basic information bits, and the incremental information bits is that a ratio of length of the original information bits to a sum of length of the basic information bits and length of the incremental information bits is equal to at least one of the remaining target encoding rates.

6. The method according to claim 1, further comprising:
    stopping transmission of the incremental information bits if an acknowledgment (ACK) signal transmitted by the MS is received.

7. The method according to claim 1, further comprising:
    completely transmitting all the incremental information bits if no ACK signal transmitted by the MS is received.

8. A method for receiving information transmitted by a base station (BS) according to a target encoding rate, comprising:
    receiving basic information bits obtained from information encoded by the BS according to the target encoding rate and transmitted by the BS; and
    within a determined time interval, if it is determined that the basic information bits are correctly decoded, stopping receipt of incremental information bits obtained from the information encoded by the BS according to the target encoding rate and sequentially transmitted by the BS within the determined time interval;
    wherein the target encoding rate is an encoding rate used by the BS when a mobile station (MS) is capable of correctly decoding the information transmitted by the BS.

9. The method according to claim 8, further comprising:
    in the determined time interval, if it is determined that the basic information bits are correctly decoded, transmitting an acknowledgment (ACK) signal to the BS, so as to instruct the BS to stop transmitting the incremental information bits.

10. The method according to claim 8, further comprising:
    within the determined time interval, when the basic information bits are not correctly decoded, receiving at least one incremental information bit obtained from the information encoded by the BS according to the target encoding rate and sequentially transmitted by the BS within the determined time interval.

11. The method according to claim 10, further comprising:
    in the determined time interval, when it is determined that the basic information bits and the at least one incremental information bit are correctly decoded, stopping receipt of remaining incremental information bits transmitted by the BS.

12. The method according to claim 11, further comprising:
    in the determined time interval, when it is determined that the basic information bits and the at least one incremental information bit are correctly decoded, transmitting an acknowledgement (ACK) signal to the BS, so as to instruct the BS to stop transmitting the remaining incremental information bits.

13. A base station (BS), configured to transmit information according to a target encoding rate, and comprising:
    a matching unit, configured to obtain basic information bits and at least one incremental information bit from information encoded by the BS according to the target encoding rate; and
    a transmission unit, configured to sequentially transmit the basic information bits and the at least one incremental information bit to a mobile station (MS) within a determined time interval;
    wherein the target encoding rate is an encoding rate used by the BS when the MS is capable of correctly decoding the information transmitted by the BS; and
    wherein the at least one incremental information bit is an information bit selected for meeting requirements of other target encoding rates.

14. The BS according to claim 13, wherein the matching unit is further configured to obtain target encoding rates of multiple MSs, obtain the basic information bits according to a target encoding rate with a maximum value in the target encoding rates of the multiple MSs, and obtain the at least one incremental information bit according to the remaining target encoding rate.

15. The BS according to claim 14, wherein the matching unit comprises:
an encoding unit, configured to perform turbo code encoding on original information bits that need to be transmitted and interlace the encoded information; and
wherein the matching unit is further configured to obtain the basic information bits from the interlaced encoded information according to a constraint relation between the original information bits and the basic information bits, wherein the constraint relation between the original information bits and the basic information bits is that, a ratio of length of the original information bits to length of the basic information bits is equal to the target encoding rate with the maximum value.

16. The BS according to claim 14, wherein the matching unit is further configured to select information bits that are capable of being correctly decoded by the MS and are corresponding to at least one of the remaining target encoding rates from the interlaced encoded information according to one of the remaining target encoding rates, and obtain the incremental information bits according to a constraint relation among the original information bits, the basic information bits, and the incremental information bits;
wherein the constraint relation among the original information bits, the basic information bits and the incremental information bits is that, a ratio of length of the original information bits to a sum of length of the basic information bits and length of the incremental information bits is equal to one of the remaining target encoding rates.

17. The BS according to claim 13, further comprising:
a receiving unit, configured to receive an acknowledgment (ACK) signal transmitted by the MS;
wherein the transmission unit is further configured to stop transmitting the incremental information bits when the receiving unit receives the ACK signal transmitted by the MS.

18. A mobile station (MS), comprising:
a receiving unit, configured to receive basic information bits obtained from information encoded by a base station (BS) according to a target encoding rate and transmitted by the BS; and
a decoding unit, configured to determine whether the basic information bits are capable of being correctly decoded within a determined time interval;
wherein, the receiving unit is further configured to stop receiving incremental information bits obtained from the information encoded by the BS according to the target encoding rate and sequentially transmitted by the BS within the determined time interval when the decoding unit performs correct decoding, and the target encoding rate is an encoding rate used by the BS when the MS is capable of correctly decoding the information transmitted by the BS.

19. The MS according to claim 18, wherein the receiving unit is further configured to receive at least one incremental information bit obtained from the information encoded by the BS according to the target encoding rate and sequentially transmitted by the BS within the determined time interval when the decoding unit is unable to perform correct decoding within the determined time interval.

20. The MS according to claim 19, wherein
the decoding unit is further configured to determine whether the basic information bits and the at least one incremental information bit are capable of being correctly decoded within the determined time interval; and
the receiving unit is further configured to stop receiving the remaining incremental information bits sequentially transmitted by the BS within the determined time interval when it is determined that the basic information bits and the at least one incremental information bit are correctly decoded within the determined time interval.

21. The MS according to claim 18, further comprising,
a transmission unit, configured to transmit an acknowledgment (ACK) signal to the BS when it is determined that the basic information bits or the basic information bits and the at least one incremental information bit are correctly decoded within the determined time interval, so as to instruct the BS to stop transmitting the remaining incremental information bits.

\* \* \* \* \*